July 5, 1927.
F. J. HERMAN
FAUCET
Filed Nov. 23, 1926
1,635,123
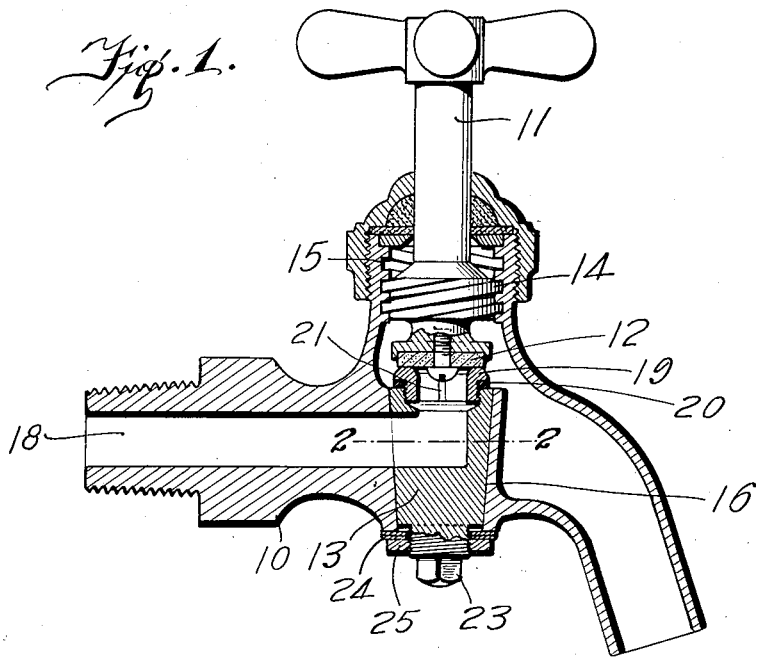
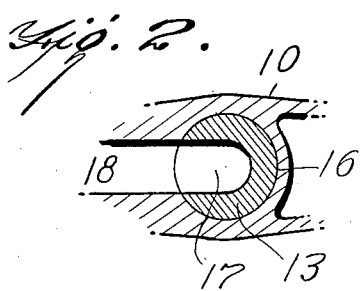
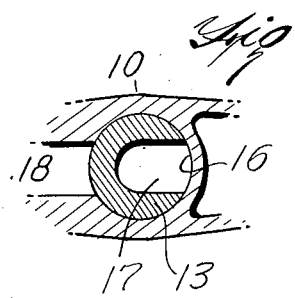
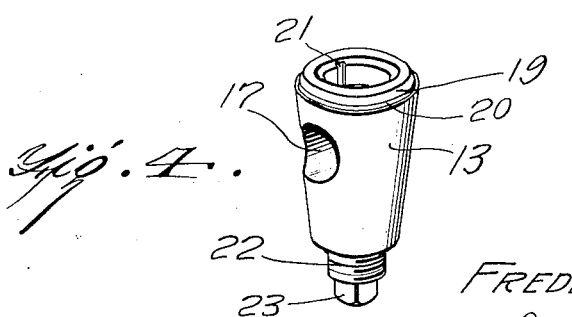
Inventor
FREDERICK J. HERMAN,
By
Attorney Patented July 5, 1927.

1,635,123

UNITED STATES PATENT OFFICE.

FREDERICK J. HERMAN, OF SACRAMENTO, CALIFORNIA.

FAUCET.

Application filed November 23, 1926. Serial No. 150,266.

In replacing a washer in the usual faucet or spigot, the water supply must of course be cut off, and frequently due to the location of the cut off valve, this becomes a difficult task.

To overcome this and other disadvantages in the usual faucet, my invention relates to a very simple, highly efficient and extremely practical device that may be readily built into a faucet whereby the water supply may be effectually cut off by simply turning the valve approximately 90°. The scope of my invention extends to whatever construction may be defined by or included within the terms or language of the appended claim.

In the drawings:

Figure 1 illustrates a central, longitudinal section through a faucet embodying my invention, the valves being shown in an opened position;

Figure 2 is a transverse, sectional view on the line 2—2 of Figure 1;

Figure 3 is a similar view but showing valve in a closed position within its respective seat, and Figure 4 is a view in perspective of the valve.

My invention in the form or embodiment shown in the drawing and briefly described comprises a body 10 which may be of any desired shape or form, a valve stem 11 provided with the usual seat for the washer 12, and a cut-off valve 13. The valve stem 11 is of course provided with the usual exteriorly threaded portion 14 which is adapted for engagement with the threads 15 formed on the interior of the faucet.

The valve 13 is substantially formed tapered so that it may be more readily fitted within the seat 16. The horizontally disposed opening 17 formed in the valve 13 of course aligns with the opening 18 in the faucet and communicates with the vertically extending opening in the valve 13.

The upper end of the central opening in the valve 13 is slightly enlarged and screwthreaded for the purpose of receiving the removably mounted seat 19. A relatively thin gasket 20 is interposed between the flange of the seat 19 and the upper end of the valve 13 for the purpose of securely fastening the seat 19 with respect to the valve 13 and to prevent the possibility of leakage between them. A pair of vertically extending grooves 21 are formed on the inner side of the seat 19 to not only facilitate the clamping of the seat 19 with respect to the valve 13 but serves as an excellent means of oscillating the valve 13 with respect to the seat 16 when grinding the valve 13 into its respective seat.

The lower end of the valve 13 is provided with a somewhat reduced and exteriorly threaded portion 22 and a further reduced extension or polygonal end 23. A spring washer 24 is interposed between the lower end of the valve seat 16 and the adjacent surface of the lock nut 25 for firmly retaining the valve 13 within its respective seat to prevent its accidental displacement therein. When it is desired to alter the position of the valve 13 within its seat 16 as in opening or in closing it, this is of course accomplished by means of the polygonal end 23.

It is at once obvious that since the washer 12 may be readily removed and the seat 13 may be quickly replaced, without cutting off the main supply of water, my improved faucet need not be replaced for a comparatively long period.

I am aware of the fact that a great many attempts have been made to accomplish this result, but I know of no instance wherein valves such as globe valves or faucets have been provided with a cut off valve feature as herein disclosed.

I claim:

A faucet having a water passage therethrough, a vertical conical bore intercepting the water passage and opening through the bottom of the faucet, a conical valveplug seating in said bore, means on the end of the plug extending beyond the faucet to permit turning of the plug, a nut cooperating with such means to secure the plug in fixed relation to the faucet at will, said plug being formed with a continuous passage horizontal in part and vertical in part to selectively provide a continuation of or an interruption to said water passage, a stem vertically adjustable in the faucet, a valve disk removably carried by the stem, and a valve seat for said disk, said seat being threaded in the upper end of the plug and having a diameter less than the diameter of the proximate end of the plug to avoid interference with the complete seating of the plug in the bore.

FREDERICK J. HERMAN.